US005863373A

United States Patent [19]

Traise et al.

[11] Patent Number: 5,863,373

[45] Date of Patent: Jan. 26, 1999

[54] PRESSURE SEALING METHOD FOR BUSINESS FORMS

[75] Inventors: John E. Traise, Niagara Falls, N.Y.; Wilbur P. Hutchinson, Mt. Prospect, Ill.

[73] Assignee: Moore Business Forms, Inc., Grand Island, N.Y.

[21] Appl. No.: 735,822

[22] Filed: Oct. 23, 1996

Related U.S. Application Data

[60] Continuation of Ser. No. 870,873, Apr. 20, 1992, abandoned, which is a division of Ser. No. 417,775, Oct. 6, 1989, Pat. No. 5,397,427.

[51] Int. Cl.[6] ...... B32B 31/00

[52] U.S. Cl. ...... 156/290; 156/292; 156/441.5; 156/555; 100/171

[58] Field of Search ...... 156/290, 291, 156/292, 479, 548, 553, 555, 556, 441.5, 582; 100/153, 171

[56] References Cited

U.S. PATENT DOCUMENTS

| | | | |
|---|---|---|---|
| 426,728 | 4/1890 | Maret . | |
| 891,701 | 6/1908 | Jennings . | |
| 2,190,413 | 2/1940 | Davidson | 271/49 |
| 2,234,223 | 3/1941 | Ball | 156/553 |
| 2,331,054 | 10/1943 | Shively | 154/42 |
| 2,362,819 | 11/1944 | Hinchey | 93/2 |
| 2,746,221 | 5/1956 | Rouan et al. | 53/31 |
| 2,893,468 | 7/1959 | Fieroh | 154/42 |
| 2,944,587 | 7/1960 | Newcombe | 156/550 |
| 3,006,257 | 10/1961 | Orsini | 93/35 |
| 3,068,933 | 12/1962 | Klar | 156/367 |
| 3,152,800 | 10/1964 | Hanson | 270/1 |
| 3,449,196 | 6/1969 | Yumoto et al. | 156/498 |
| 3,474,952 | 10/1969 | Cover, Jr. et al. | 229/53 |
| 3,527,632 | 9/1970 | Holes | 156/479 |
| 3,540,970 | 11/1970 | Huntwork | 156/556 |
| 3,727,908 | 4/1973 | Whitesell et al. | 156/290 |
| 3,749,631 | 7/1973 | Batchelder et al. | 156/350 |
| 4,033,807 | 7/1977 | Neill et al. | 156/384 |
| 4,085,560 | 4/1978 | McClosky | 53/27 |
| 4,343,129 | 8/1982 | Gunther et al. | 53/206 |
| 4,426,035 | 1/1984 | Dieckow | 206/526 |
| 4,451,320 | 5/1984 | Marvel | 156/555 X |
| 4,461,661 | 7/1984 | Fabel | 156/70 |
| 4,540,458 | 9/1985 | Baughman et al. | 156/312 |
| 4,684,433 | 8/1987 | Gohr | 156/517 |
| 4,716,435 | 12/1987 | Wilson | 100/93 RP |
| 4,721,501 | 1/1988 | Herrington | 493/193 |
| 4,721,502 | 1/1988 | Herrington | 493/193 |
| 4,826,475 | 5/1989 | Ewerydd | 493/10 |
| 5,019,203 | 5/1991 | Singer | 156/582 X |

FOREIGN PATENT DOCUMENTS

| | | |
|---|---|---|
| 1197155 | 11/1985 | Canada . |
| WO 87/02943 | 5/1987 | WIPO . |

*Primary Examiner*—James Engel
*Attorney, Agent, or Firm*—Nixon & Vanderhye, P.C.

[57] ABSTRACT

Business forms are sealed by pressure with reduced tenting and pillowing. Each form has a strip of pressure sensitive adhesive of a predetermined width. In an automatic continuous, sequential manner, upper and lower rollers operatively biased together by spring pressure activate the pressure sensitive adhesive to affix one part of the form to another. The force applied by the rollers is applied only to the approximate area of the predetermined width of the adhesive, not over the whole form. Conveyor tapes are associated with the rollers to facilitate conveyance of the forms, and a pressure of about 120 lbs. per lineal inch is applied to the pressure sensitive adhesive. A buckle or insert folder can be used to fold the forms, and they are then fed to a first pressure sealing module. A 90° transfer conveyor conveys the forms from the first pressure sealing module to a second module, and from the second module they are removed by a discharge conveyor.

18 Claims, 5 Drawing Sheets

PRESSURE SEALING METHOD FOR BUSINESS FORMS

This is a continuation of application Ser. No. 07/870,873, filed 20 Apr. 1992, now abandoned, which is a divisional of Ser. No. 07/417,775, filed Oct. 6, 1989, now U.S. Pat. No. 5,397,427, dated Mar. 14, 1995.

BACKGROUND AND SUMMARY OF THE INVENTION

In the manufacture of business forms, it is almost always necessary to seal one part of the form construction with respect to another. This is typically accomplished by utilizing an adhesive which acts between the two portions of the business form to be fixed together. Oftentimes heat activated adhesives are utilized, but in many circumstances it is desirable to utilize pressure sensitive adhesives.

A sealing system for business forms used with one type of pressure sealing adhesive requires that the adhesive applied to the forms during manufacture be capable of cohesive bonding to a fiber tearing strength when pressure sealed after computer printing by the end user, but must be entirely free of adhesive bonding under all conditions of normal handling during manufacture, storage and imaging. Thus the margins of pressure applied to the paper during normal handling, and the pressure applied to effect fiber tearing bonds are widely separated.

A typical pressure sealing piece of equipment for use with business forms uses a multiple roll sealing system to apply pressure to the entire web (or the entire individual sheets) being processed. Those rolls are capable of exceeding the threshold unit pressure required, which is quite high, typically about 200 lbs. per lineal inch of paper width when using a succession of two or three pressure couples. This requires a very rigid yet accurate mechanical system. While the application of such high forces requires massive and precise construction of the sealer, it is also necessary that the web or sheet manifold be clean—that is that there be no disturbances in the surface configuration. Therefore it is extremely difficult to utilize such equipment with inserts, window patching, folds internal to the form, etc., since such build ups in thickness or non-uniformities in the surface characteristics decrease the unit pressure at the sealing edges and could increase the sealing pressure in the inclusion area so that a jam or physical tearing of the sheet occurs. When inserts are provided, there also is the problems of "tenting" or "pillowing".

According to the present invention, a method and apparatus are provided that overcome the problems associated with full-width pressure sealing systems. According to the present invention it is possible to continuously, and at high speed, act upon business forms including those having inserts, window patching, folds internal to the forms, and other surface non-uniformities. The "pillowing" effects (where the sealed manifold is forced apart), and the "tenting" effects (where various plies of the assembly shift relative to each other and thereby prevent formation of a completely flat form) are substantially avoided.

The general manner in which the desirable results are accomplished according to the invention is by effecting sealing along only the pressure sensitive adhesive strips of the business forms—rather than along the entire surface of the forms. This allows the coupling force between each sealing roll pair to be reduced from about 1,000 lbs. in the prior art, to about 100–200 lbs., dependent on the ratio of total form width to sealing bond width. This also allows production of a system that is much less massive than conventional, and one that is reliable and simple and easy to utilize.

According to one aspect of the present invention, a method of handling business forms is provided, each form having at least one strip of pressure sensitive adhesive of a predetermined width for affixing one part of the form to another part. The method comprises the step of (a) automatically, in a continuous, sequential manner, acting on successive individual business forms to apply a force to them sufficient to activate the pressure sensitive adhesive to fix one part of the form to another, the force being applied only to the approximate area of the predetermined width of adhesive. Typically the business forms would each have first and second generally parallel strips of pressure sensitive adhesive each of a predetermined width, and step (a) would be practiced so as to apply the activating force to the approximate areas of both strips of adhesive. The business form may have a third (or others) strip of pressure sensitive adhesive generally perpendicular to the first strip, and of a predetermined width. In a continuous and sequential manner, according to the method of the invention the form would be acted on to apply a force to the third strip, too, this force also being applied only to the approximate area of the predetermined width of the third adhesive strip. Prior to the practice of step (a), the business form may be initially configured by folding a sheet of paper to provide at least two plies. The paper may be V-folded, C-folded, or Z-folded. An insert may be inserted between the plies, in which case the adhesive activating step or steps are practiced so that activating force is not applied to any area of the business form containing the insert.

According to another aspect of the invention a pressure applying system for applying pressure to business forms to activate pressure sensitive adhesive associated with the forms is provided. The system comprises a frame, and a pressure applying device operatively connected to the frame. The pressure applying device comprising means for simultaneously applying pressure along a pair of spaced, generally parallel strips while simultaneously conveying business forms through the device, including two sets of narrow width upper and lower rollers. The upper roller of each set is disposed above and in peripheral engagement with the lower roller of that set along a common vertical center line. The pressure applying device also preferably further comprises a pair of conveyor transport belts or tapes, one associated with each set of rollers, and mounted interiorly of the rollers for assisting conveyance of business forms between the rollers. Each upper and lower roller preferably has a segment with an elastomeric material periphery to assist accurate rotary displacement of said upper and lower roller pairs.

According to a further aspect of the present invention, there is provided a first pressure sealing device comprising upper and lower rollers disposed on a common vertical centerline, and means for applying a force to the upper roller sufficient to effect activation of the pressure sensitive adhesive of the business forms acted thereon, the rollers having a width approximately equal to the predetermined width of a strip of pressure sensitive adhesive which they act upon (e.g. about 0.3–0.7 inches). A second pressure sealing device, substantially identical to the first device, is also provided. Feeding means feed business forms in a continuous manner to the first device upon exiting the first sealing mechanism. A 90° transfer conveyor means continuously feeds business forms from the first device to a second similar sealing device; and, discharge conveyor means convey sealed forms away from the second device.

According to yet another aspect of the present invention a pressure applying distinct module is provided. The module comprises: A stationary frame, a lower roller, a first shaft for mounting the lower roller for rotation about a first generally horizontal axis, the axis being fixed with respect to the frame, and an upper roller. Also provided are: means for mounting the upper roller so that it is distinct from the first shaft and frame, but so that the upper and lower rollers are on a common vertical center line, and so that it is rotatable about a second generally horizontal axis, parallel to the first axis; and force applying means for applying a force between the frame and the upper roller so that the periphery of the upper roller is operatively pressed into engagement with the periphery of the lower roller. The first shaft is rotated about its axis of rotation by a motor.

The force applying means (e.g spring or hydraulic) preferably applies sufficient force to the upper roller so that there is a pressure of about 100–200 lbs per lineal inch exerted by the rollers on the sheet material therebetween.

The rollers and the apparatus according to the invention typically are steel pressure wheel couples having a diameter of about three inches, and separated by a linear distance of about 3½ inches. They have an operative peripheral width of about 0.3–0.7 inches (e.g. about ½ inch) so that they act only on that portion of the business form on which the strip of pressure sensitive adhesive is applied. Preferably horizontally spaced sets of rollers are provided so that multiple parallel strips of pressure sensitive adhesive can be acted upon at the same time, and the horizontal spacing between the rollers perpendicular to the direction of movement of the forms may be adjusted to accommodate forms of different dimensions. The second pair (in the direction of form movement) of rollers of each set is very slightly larger in diameter than the first, to provide a slight tension on the forms during conveyance.

It is the primary object of the present invention to provide for the effective high speed automatic sealing of business forms in a continuous, successive manner by applying pressure only to strips of pressure sensitive adhesive associated with the forms, and not other parts of the form. This and other objects of the invention will become clear from an inspection of the detailed description of the invention, and from the appended claims.

DETAILED DESCRIPTION OF THE DRAWINGS

Figure 1:
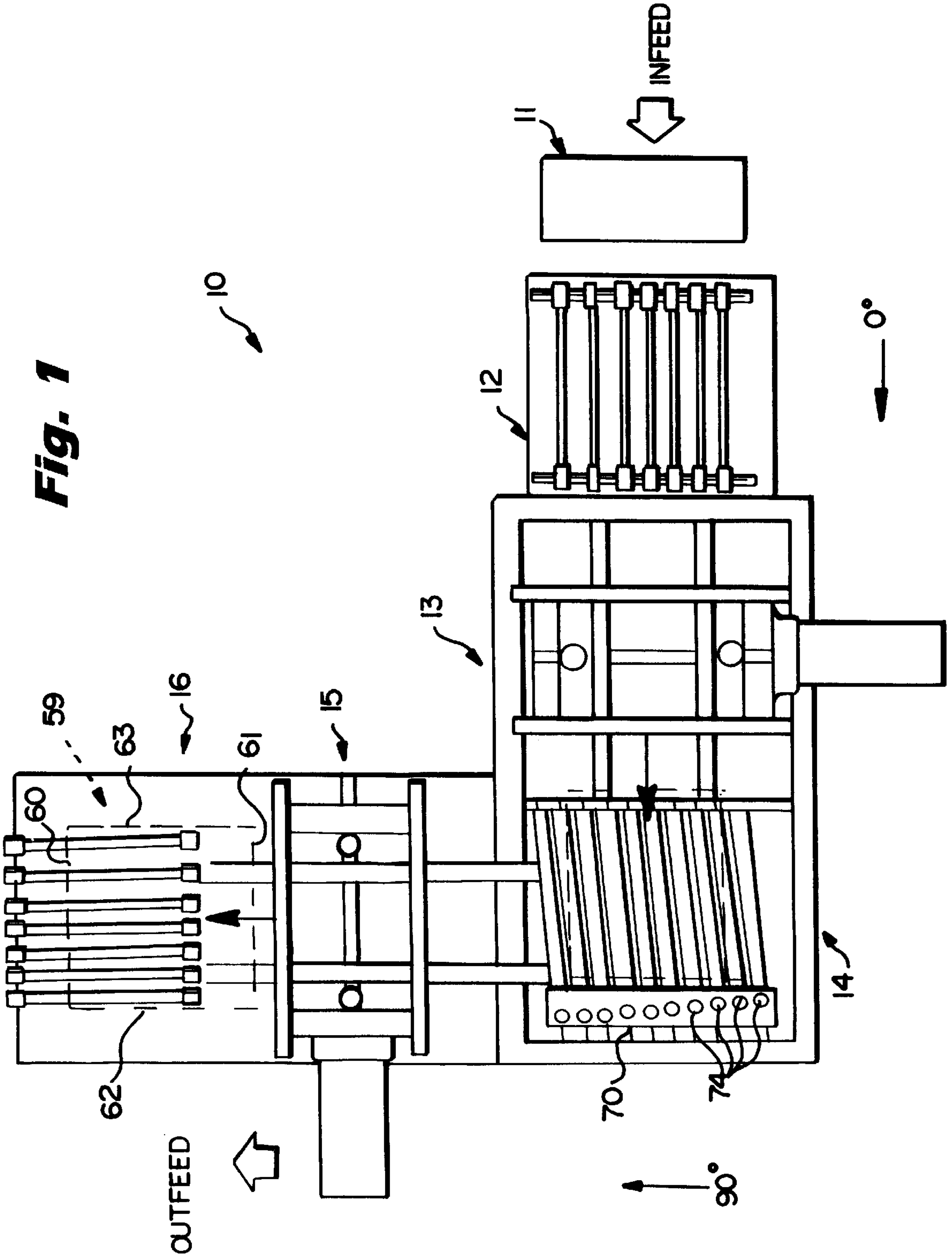
FIG. 1 is a top schematic view of an exemplary pressure sealing system for business forms, according to the invention.

An exemplary pressure sealing system for business forms according to the invention is illustrated generally by reference numeral 10 in FIG. 1. Preferably, although not necessarily, the system 10 has as a part thereof a buckle folder, or folder inserter 11, for feeding business forms in a continuous manner to a first pressure sealing device 13, preferably using conventional in feed conveyor 12. The first pressure sealing device 13 includes a plurality of rollers and conveyor tapes to effect contemporaneous sealing and conveyance of the forms, as will be described hereinafter. The system 10 further comprises a 90° transfer conveyor means 14 for continuously feeding business forms from the first device 13 to a second device 15. The second pressure sealing device 15 is substantially identical to the first device 13 and will be hereinafter described in detail. Attached to the second device 15 is a discharge conveyor means 16 for conveying sealed forms away from the second device 15. The feeding means 12, right angle conveyor 14, and discharge conveyor 16 are conventional components.

Figure 2:
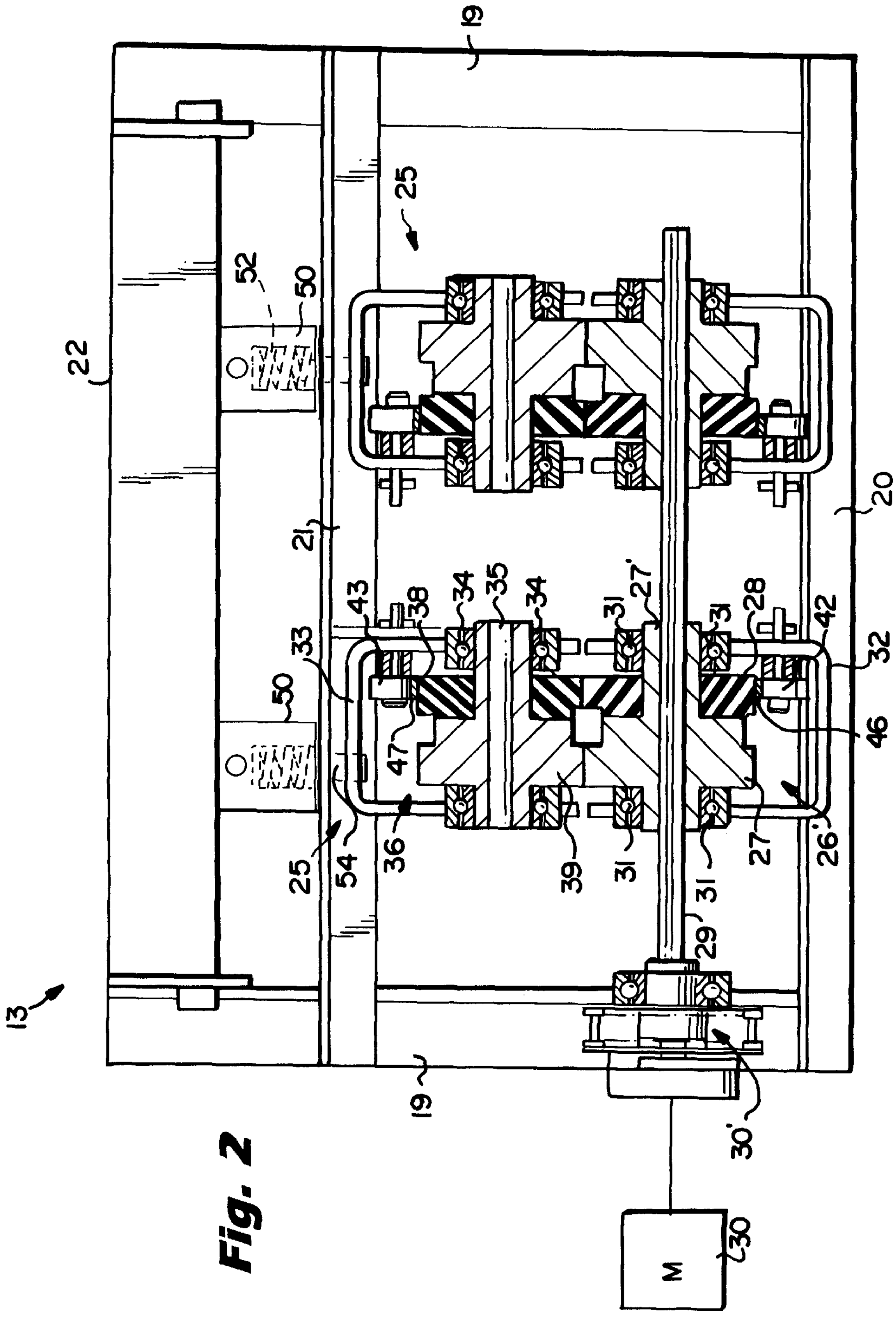
FIG. 2 is an end view of one of the sealing devices of the system of FIG. 1, partly in cross-section and partly in elevation.
Figure 3:
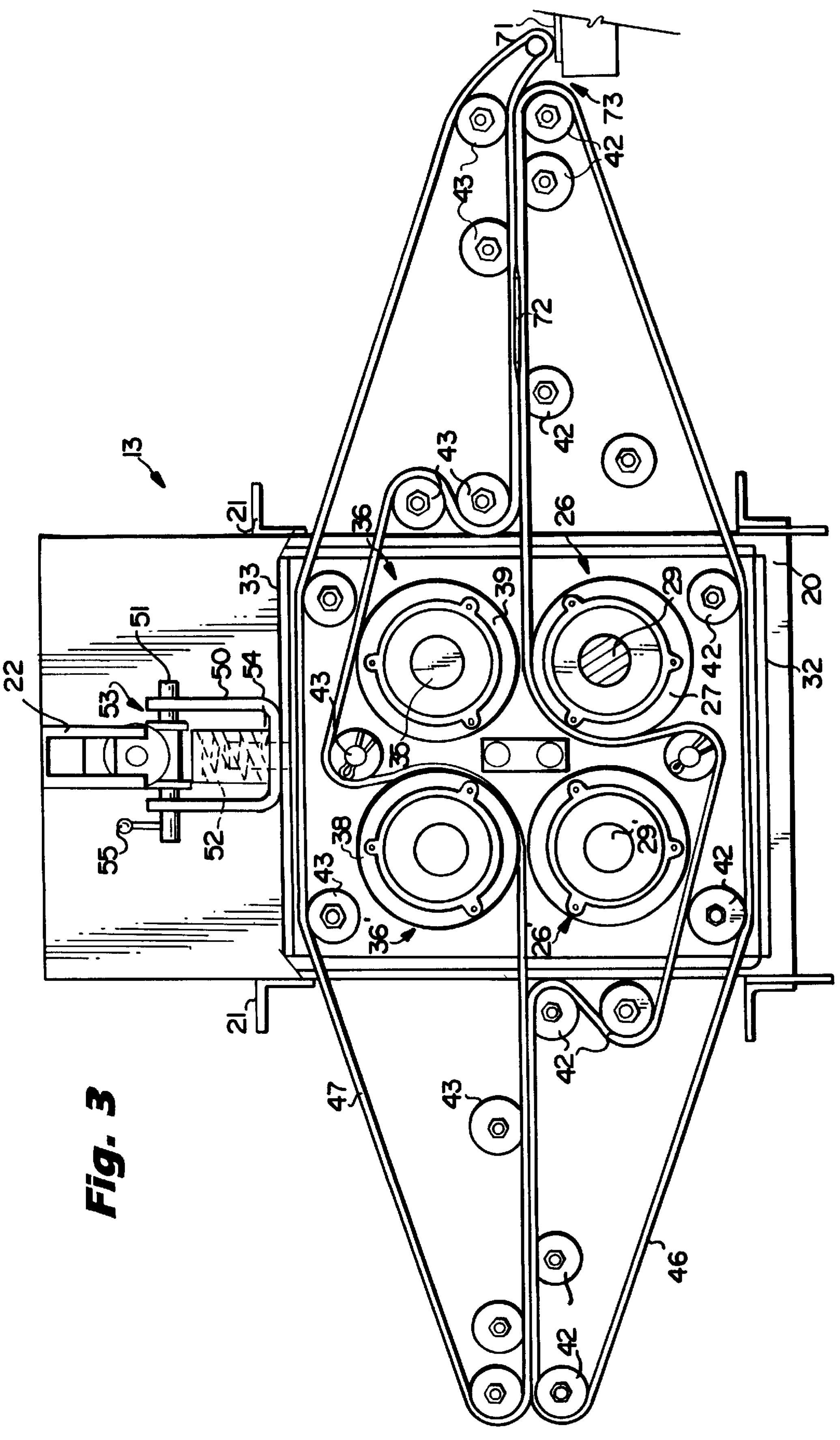
FIG. 3 is a side view of the device of FIG. 2.

An exemplary pressure sealing device 13 according to the invention can be seen in FIGS. 2 and 3. Each device 13 comprises a frame 19 that is stationary, including a bottom support 20, a reinforcing cross-brace 21, and a top truss bar 22 against which spring or hydraulic pressure (hereinafter described) is applied. At least one pressure applying device, shown by reference numeral 25, is operatively connected to the frame. Preferably two such devices are provided horizontally spaced from each other in a dimension perpendicular to the dimension of movement of forms through the device 13. Hydraulic pressure would typically be used in a plant environment, and spring pressure in an office environment.

Figure 4:
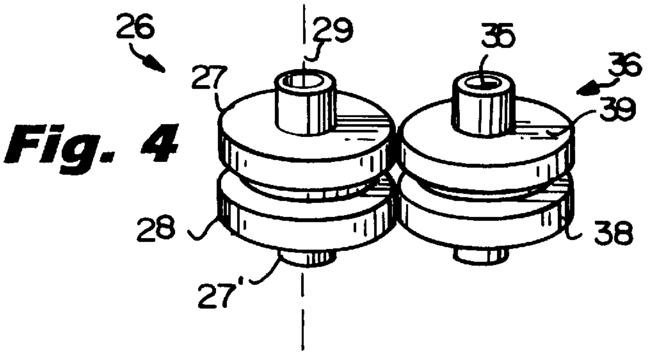
FIG. 4 is a top perspective view of one composite set of upper and lower rollers of the device of FIGS. 2 and 3.

Each pressure applying device 25 includes at least one lower roller 26, and preferably two lower rollers (26, 26' in FIG. 3). Each lower roller (26) has peripheral portions 27, 28 with a recess therebetween. A typical lower roller 26 is shown at perspective in FIG. 4. Preferably the diameter of the roller portions 27, 28 is slightly over three inches, having a circumference of about ten inches. This is a relatively large diameter so as to provide an approach angle at the nip between the lower roller 26 and the upper roller (to be hereinafter described) as low as possible. The diameter of roller 26 (the second in the direction of conveyance of the forms) may be the same as, or very slightly greater than, that of roller 26' to provide a slight tension on the forms, as a form set being processed from first sealing couple 26-36 to second sealing couple 26'-36'.

The roller 26 is mounted for rotation on a shaft 29, which preferably is a splined shaft. The shaft 29 is horizontal and essentially perpendicular to the direction of movement of the forms through the device 13. The shaft 29 is rotated by a conventional electric motor 30 (FIG. 2) or the like. A conventional belt or gear assembly 30' connects shafts 29, 29' so that they are simultaneously driven by motor 30.

Bearings 31 are provided for mounting the ends of the roller 26 for rotation about the axis defined by shaft 29, the bearings being received within a U-shaped support 32 which is maintained stationary during rotation of the shaft 29. The support 32 may engage the bottom plate 20, or other part of the frame 19, so that it is supported thereby yet it must be slideable with respect to the frame 19 in order to adjust the spacing between the devices 25 mounted on the common shaft 29. Typically the device 13 would be set up on a center line register arrangement, with the spacing between the devices 25 being dependent upon business form dimensions and geometry.

An upper U-shaped support 33 is provided having bearings 34 for mounting the shaft extensions 35 of an upper roller 36 which cooperates with the bottom roller 26. The upper roller 36 has peripheral portions 38, 39 separated by a recess, for cooperating with the peripheral portions 28, 27, respectively, of the lower roller 26. Roller portions 28, 38 are both of elastomeric material (e.g. urethane O-rings), while 27, 39 are of metal (e.g. steel). The elastomeric material engagement causes the rolls to rotate even when the actual sealing wheels are out of engagement. The elastomeric material also provides a resilient cushion to reduce the impact noise which would otherwise occur when the paper forms pass from a roll couple.

As can be seen in both FIGS. 2 and 3, the device 13 also includes a plurality of relatively small diameter accessory rollers 42, 43, the set 43 being associated with the lower rollers 26, and the set 43 with the upper rollers 36. A conveyor tape 46 cooperates with the lower rollers 26 and their accessory rollers 42, while a conveyor tape 47 cooperates with the upper rollers 36 and their cooperating rollers 43. The rollers 42, 43 are all rotatable about horizontal axes parallel to the shaft 29. The conveyor tapes 46, 47 are preferably about ⅝ of an inch in width and are of reinforced plastic or like material conventionally used for conveyor belts. The rollers 42 are mounted on the support 32, or extensions thereof, while the rollers 43 are mounted on the support 33 or extensions thereof.

The tapes 46, 47 engage the lower roller portion 28 and upper roller portion 38, respectively and are driven by rotation of the rollers 26. The elastomeric nature of the peripheral portions 28, 38 of the rollers 26, 36 provides a secure engagement between the rollers 36, 26, and with the conveyor tapes 46, 47. The conveyor tapes 46, 47 are mounted interiorly of the devices 25, that is they cooperate with the interior peripheral surfaces 28, 38 rather than the exterior ones 27, 39.

There is also provided a force applying means for applying the force between the frame and the upper rollers 36 so that the periphery of the upper rollers 36 is operatively pressed into engagement with the periphery of the lower rollers 26. Such force applying means may be a hydraulic element, but preferably—for simplicity—comprises spring means as illustrated in FIGS. 2 and 3. Such force applying means in the preferred embodiment includes a U-shaped bracket 50 mounting a rotatable shaft 51 therein, with a coil spring 52 received within the bracket 50 and acting between the bottom of the bracket 50 and a cam 53 mounted on the shaft 51. The bottom of the bracket 50 is connected by extension 54 to the support 33, while the cam 53—in the operative position thereof—engages the channel 22 of the stationary frame 19. A handle 55 allows rotation of the shaft 51 to move the cam from an "on" position wherein it compresses the spring 52 and causes the springs to apply a downward force to the upper roller 36, and an "off" position in which it does not compress the spring 52, and therefore no spring force (only a relatively small gravitational force) biases the upper roller 36 downwardly. Normally the springs 52 urge the top rollers 36 into actual engagement with the rollers 26. However, a mechanical stop (not shown) may be provided so that a small clearance (less than a double thickness of paper) is provided (i.e. the rollers 36 are operatively biased into engagement with the lower rollers 26).

It should be appreciated that the upper rollers 36 are entirely distinct from the lower rollers 26, and from the frame 19, having no positive or rigid connections thereto. Also the driving action for rotating the rollers 26, 36, and for powering the conveyor tapes 46, 47 is provided solely by rotation of the shaft 29 by the motor 30. The frictional engagement between the lower roller peripheral surface 28 and the upper roller peripheral surface 38 under the influence of the force provided by the spring 52 causes the lower roller 26 to drive the upper roller 36. Similarly the frictional engagement between the tapes 46, 47 and the rollers 26, 27 and 42, 43, respectively, provides the driving action for the tapes 46, 47 which engage the business forms and convey them to the nip between the metal roller portions 27, 39 (which effect the seal).

In an actual operating commercial device employing the teachings of the invention, it is desirable to provide a fault detector for sensing when there is a possible jam. For example photoelectric sensors may be provided at the exit of each of the devices 13, 15 to distinguish between black and white (relying upon the reflectivity of the forms). If the discharge area is either "black" or "white" more than a predetermined period of time (e.g. about ½ second), then the system will be automatically shut down since it will be presumed that a fault (jam) exists. Also, it is desirable to provide a control console at the second device 15 for operating the entire system, the control console providing a power on and off switch, along with run, stop, and jog switches. It is also desirable to provide all of the circuitry in modules that may be pulled out and worked on, and to provide all the circuitry with solid state components. However such details as a specific fault detector, control panel, circuitry, and the like, are not a part of the present invention.

Figure 5:
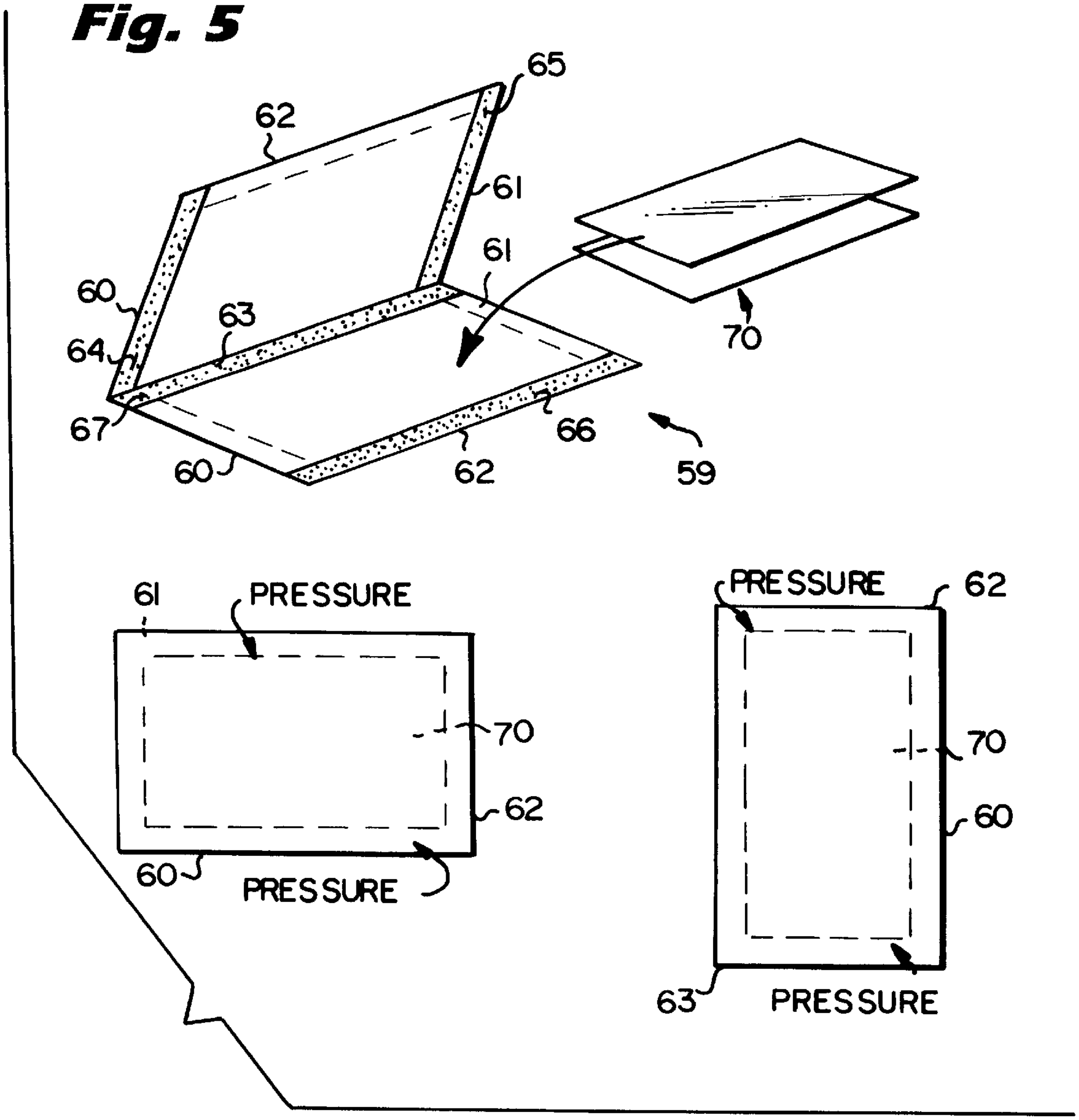
FIG. 5 is a schematic representation illustrating the manner of manufacture of an exemplary business form according to the method of the present invention.

FIGS. 1 and 5 illustrate a typical business form that may be handled according to the invention, and its manner of passage through the system 10. Typically a sheet of paper to form the business form 59 is first folded in the buckle or insert folder 11. It could either be V-folded, C-folded, or Z-folded. The folded form 59 comprises a first edge 60 and a second parallel side edge 61, a leading edge 62, and a trailing edge 63. Narrow strips of pressure sensitive adhesive 64, 65 are provided on one of the portions of the folded over sheet 59, and at least one or both of pressure sensitive adhesive strips 66, 67 (which are perpendicular to the strips 64, 65) are also preferably provided. Under many circumstances it is desirable that the folder 11 be capable of inserting inserts, such as the insert sheets 70.

After folding and insertion of the insert 70, the form 59 passes to the first device 13, with the edge 62 the leading edge. The rollers 26', 36' and 26, 36 of each of the roller sets engage (i.e. at portions 27, 39) the form 59 only at the adhesive strips 64, 65 while the conveyor tapes 46, 47 engage interior portions of the form 59. The strips 64, 65 are approximately the same width as the roller peripheral portions 27, 39, i.e. about 0.3–0.7 inches (e.g. about ½ inch). The pressure applied by the roller portions 27, 39 (via springs 52) is preferably between about 100–200 lbs. per lineal inch (e.g. 120 lbs. per lineal inch), effective to make a secure seal. Note that the roller surfaces 27, 39 do not engage any portion of the form 59 in which the inserts 70 are disposed so that tenting and pillowing are substantially avoided.

After sealing the strips 64, 65, the form is automatically moved by the right angle conveyor 14 so that the edge 60 is now the leading edge. The form then passes through the second device 15 and this time the strips 66, 67 are activated by pressure in the same manner described earlier with respect to the strips 64, 65. Thus a completely sealed business form 59 is produced.

The movement of each form set occurs in the 0° direction of the first device 13 until the first device releases the form set to begin movement in the 90° direction. During the transition of the form movement to 90°, the form is controllably moved clear of the subsequent form set at the time the subsequent form set enters the right angle conveyor 14, although there may be a brief time when the subsequent form set overlaps the first form set in the transfer area. Relative speeds of first device 13, right angle conveyor 14, and second device 15 are adjusted to maintain the effective lineal spacing displacement of the form sets in the second device substantially the same as in the first device. By adjusting the delivery speed through the first device 13 relative to the speed of the right angle conveyor 14 in FIG. 1, form assemblies emerging from the first device abutt the registration rail 70 and change travel direction 90° for delivery into the second device 15. A forced drop in the elevation delivery of form set 71 in FIG. 3—due to the downturned portion 73 of the upper conveyor—causes the trailing edge of an advancing form set 71 to clear the sealing elevation which allows subsequent form set 72 to overlap or "shingle" the preceding form set 71. In this manner, when the first form set 71 enters the right angle conveyor 14 it is nipped by multiple balls 74 (see FIG. 1) in registration 70 to begin a right angle travel as subsequent form set 72 enters the right angle conveyor substantially the same time, but slightly delayed compared to preceding form set 71. Right angle movement of the second form set 72 occurs at a speed related to the ratio of the length and width of the form. For example, if the width of the form is ½ the length, the lineal processing speed of the second device 15 acting upon the length of the form would be approximately double that of first device 13.

Figure 6:
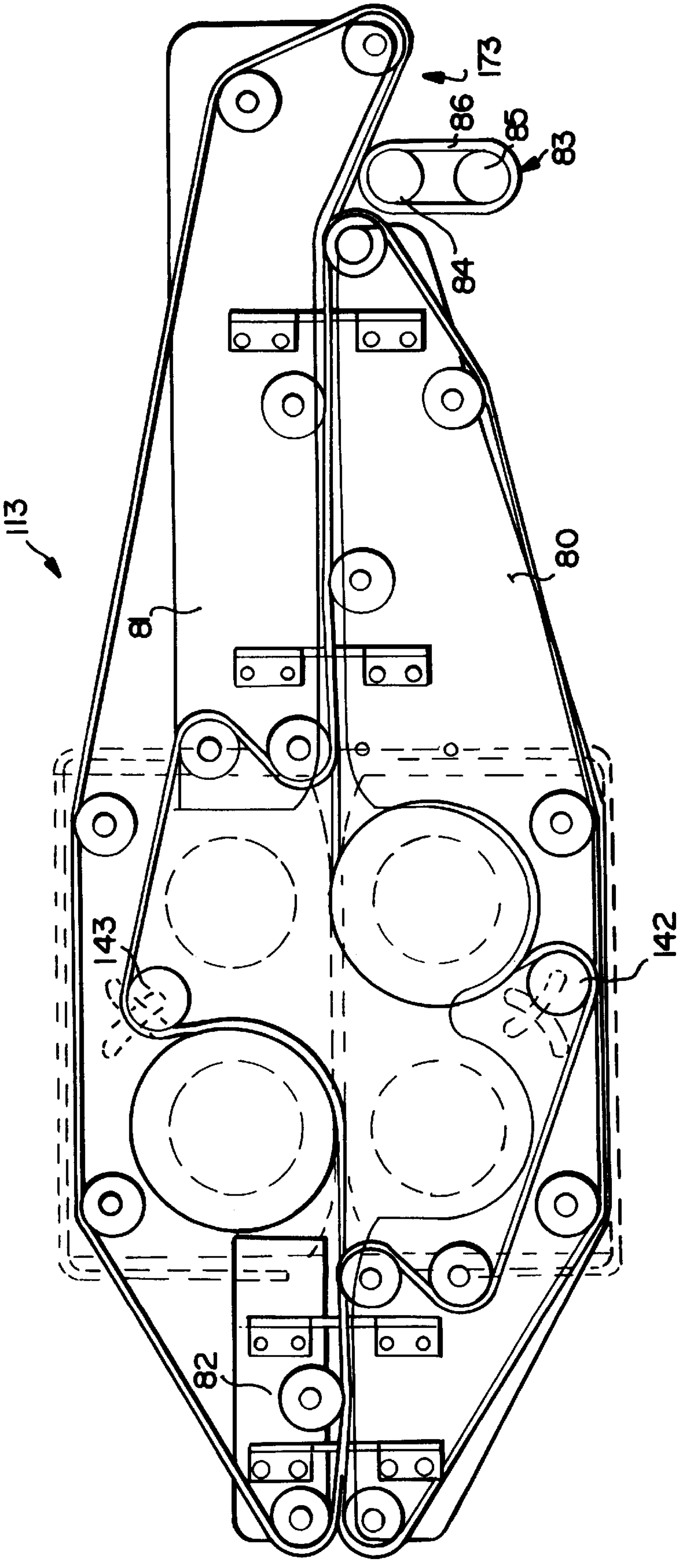
FIG. 6 is a view like that of FIG. 3 of a slightly modified form of a device according to the invention.

FIG. 6 is similar to FIG. 3 only it illustrates a slightly modified embodiment in which the relative dimensions of the components are slightly different, and end plates for actually mounting some of the rollers are shown. In this embodiment structures generally comparable to those in the FIG. 3 embodiment are shown by the same reference numeral only preceded by a "1".

The first pressure sealing device 113 includes rollers 142 and 143 that may be biased into the positions illustrated and move along the dotted line paths also illustrated in FIG. 6. All of the various rollers, etc., may be mounted on plates at their ends, such as the plates 80, 81, and 82. At the out feed end of the device 113, which has the downwardly extending portion 173, in order to facilitate proper delivery of the forms, the roller assembly 83 could be provided. The roller assembly 83 includes first and second rollers 84, 85 with a plurality of elastomeric bands 86 running in grooves on the roller 84, 85 peripheries. The bands/grooves may be spaced approximately every one and one-half inches along the length of the rollers 84, 85, and in this way they properly guide the forms as desired.

For both the FIGS. 3 and 6 embodiment, the downturned end portions 73, 173 are not absolutely necessary although desirable, and particularly the second pressure sealing device 15 need not have such a downturned end portion.

Method of Operation

In the normal practice of the method according to the invention, it is desirable to operate the folder 11 at a speed which is within a few percent of the speed of the first device 13. Also it is desirable to seal the narrow sides of the form 59 first (if there are any) and then the long sides. In order to accomplish this most effectively it is thus desirable to run the first sealer module 13 at a slightly faster speed than the second module 15. The exact speed at which the device is run will be determined by the form geometry, number of inserts, type of folding, etc.

At some facilities where the volume of form production is not particularly high, the second sealer 15 need not be employed. The forms could be run through the first sealer 13 and then turned manually 90 degrees and fed back through the sealer 13. Also if the form has only parallel pressure sensitive adhesive strips, then it need only be run through the first device 13, to provide the completed form.

According to the method of the present invention, business forms 59 are handled each having at least one strip 64 of pressure sensitive adhesive of a predetermined width. In a continuous and sequential manner successive individual business forms are automatically acted upon by applying a force thereto sufficient to activate the pressure sensitive adhesive to affix one part of the form to the other, the force being applied only to the approximate area of the predetermined width of the adhesive 64. For example the width of the strip 64 is typically about ½ inch, the same as the width of the roller portions 28, 39. The force applied results in a pressure of about 100–200 lbs. per lineal inch, preferably about 120 lbs. per lineal inch, and a plurality of strips of adhesive both parallel to and perpendicular to the strip 64 may be provided. When inserts 70 are provided in the form, the insert area is not acted upon during the practice of the method, rather only the adhesive strips.

It will thus be seen that according to the present invention a simple yet advantageous system, apparatus, and method have been provided for the pressure sealing of business forms, with reduced tenting and pillowing. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and procedures.

What is claimed is:

1. A method of handling business forms, each having first and second generally parallel strips of pressure sealing adhesive each of a predetermined width for fixing one part of the business form to another part, comprising the steps of:

(a) handling the parts of the forms such that the adhesive on one part of the business form contacts with other parts without the adhesive bonding together the parts of the form, until the adhesive is activated by pressure in step (b);

(b) automatically, in a continuous, sequential manner, securing the forms together solely with pressure sealing adhesive by acting on successive business forms to apply an activating force thereto sufficient to activate the pressure sealing adhesive to fix one part of the form to another, where the activating force is at least 100 pounds (lb.) per lineal inch and is applied by pairs of metal-surfaced rollers between which roller pairs the forms are nipped and bonded together, and wherein the activating force is applied only to the approximate area of the predetermined width of adhesive and furthermore the activating force is applied to both the first and second adhesive strips of each form simultaneously, (c) supporting each roller between a pair of bracket legs of a bracket which holds opposite ends of an axle for the roller, and applying a spring force to the bracket of at least one roller in each of said pairs of rollers, where the spring force applies sufficient force between the pairs of rollers to form the activating force between the rollers in step (b); and (d) avoiding application of a force sufficient to activate the pressure sealing adhesive to portions of the forms not proximate to the area of the predetermined width of adhesive.

2. A method as recited in claim 1 wherein each business form has a third strip of pressure sealing adhesive generally perpendicular to said first and second strips, and of a predetermined width; and comprising the further step (b), after step (a), of, in a continuous, sequential manner, acting on successive business forms to apply a force thereto sufficient to activate the pressure sealing adhesive of the third strip to fix one part of the form to another, the force being applied only to the approximate area of the predetermined width of adhesive of the third strip.

3. A method as recited in claim 2 comprising the further step (c), prior to step (a), of folding a sheet of paper to provide at least two plies, and inserting an insert between plies, to provide the business form; and wherein steps (a) and (b) are practiced so that the adhesive activating force is not applied to any area of the business form containing the insert.

4. A method as recited in claim 1 wherein each business form has a transverse strip of pressure sealing adhesive generally perpendicular to said first strip, and of a predetermined width; and comprising the further step (b), after step (a), of, in a continuous, sequential manner, acting on successive business forms to apply a force thereto sufficient to activate the pressure sealing adhesive of the transverse strip to fix one part of the form to another, the force being applied only to the approximate area of the predetermined width of adhesive of the transverse strip.

5. A method as recited in claim 4 comprising the further step (c), prior to step (a), of folding a sheet of paper to provide at least two plies, and inserting an insert between plies, to provide the business form; and wherein steps (a) and (b) are practiced so that the adhesive activating force is not applied to any area of the business form containing the insert.

6. A method as recited in claim 5 wherein step (c) is practiced by effecting either V-folding, C-folding, or Z-folding of the paper.

7. A method as recited in claim 4 wherein each form has a narrowest edge and a longest edge perpendicular to the narrowest edge, and wherein the first strip is along the narrowest edge of the business form, and the transverse strip along the longest; and comprising the further step of automatically transporting each business form at a right angle to its direction of conveyance during the practice of step (a) prior to the practice of step (b).

8. A method as recited in claim 7 further comprising handling a succession of forms through the right angle in a manner which effects partial overlap of the advancing form when being transported at a right angle.

9. A method as recited in claim 7 wherein step (a) is practiced at a rate that is faster than the rate at which step (b) is practiced.

10. A method as recited in claim 1 wherein step (a) is practiced by applying a pressure of about 100–200 lbs./lineal inch to the pressure activated adhesive strip.

11. A method as recited in claim 4 wherein step (a) is practiced by applying a pressure of about 100–200 lbs./lineal inch to the pressure activated adhesive strip.

12. A method of handling business forms, each having at least one strip of pressure sealing adhesive of a predetermined width for fixing one part of the business form to another part, comprising the steps of:

(a) handling the parts of the forms such that the adhesive on one part of the business form contacts with other parts without the adhesive bonding together the parts of the form, until the adhesive is activated by pressure in step (b);

(b) automatically, in a continuous, sequential manner, securing successive business forms together by applying an activating force to each form sufficient to apply a pressure of about 100–200 lbs./lineal inch to activate the pressure sealing adhesive to fix one part of the form to another, the force being applied only to the approximately area of the predetermined width of adhesive, where the activating force is applied by pairs of metal-surfaced rollers between which roller pairs the forms are nipped and bonded together;

(c) supporting each roller between a pair of bracket legs of a bracket which holds opposite end of an axle for the roller, and applying a spring force to the bracket of at least one roller in each of said pairs of rollers, where the spring force applies sufficient force between the pairs of rollers to form the activating force between the rollers in step (b); and (d) avoiding the application of a force sufficient to activate a pressure sealing adhesive to areas of the forms outside of the area of the predetermined width of adhesive.

13. A method as recited in claim 12 wherein the business forms each have first and second generally parallel strips of pressure adhesive each of a predetermined width, and wherein step (a) is practiced so as to apply an activating force to both the first and second adhesive strips of each form simultaneously, the force only being applied to the approximate areas of the predetermined widths.

14. A method as recited in claim 12 wherein each business form has a transverse strip of pressure sealing adhesive generally perpendicular to said first strip, and of a predetermined width; and comprising the further step (b), after step (a), of, in a continuous, sequential manner, acting on successive business forms to apply a force thereto sufficient to activate the pressure sealing adhesive of the transverse strip to fix one part of the form to another, the force being applied only to the approximate area of the predetermined width of adhesive of the transverse strip.

15. A method as recited in claim 14 comprising the further step (c), prior to step (a), of folding a sheet of paper to provide at least two plies, and inserting an insert between plies, to provide the business form; and wherein steps (a) and (b) are practiced so that the adhesive activating force is not applied to any area of the business form containing the insert.

16. A method as recited in claim 14 wherein each form has a narrowest edge and a longest edge perpendicular to the narrowest edge, and wherein the first strip is along the narrowest edge of the business form, and the transverse strip along the longest; and comprising the further step of automatically transporting each business form at a right angle to its direction of conveyance during the practice of step (a) prior to the practice of step (b).

17. A method as recited in claim 16 wherein step (a) is practiced at a rate that is faster than the rate at which step (b) is practiced.

18. A method of handling business forms, each having at least one strip of pressure sealing adhesive of a predetermined width for fixing one part of the business form to another part, comprising the steps of:

(a) handling the parts of the forms such that the adhesive on one part of the business form contacts with other parts without the adhesive bonding together the parts of the form, until the adhesive is activated by pressure in step (b);

(b) automatically, in a continuous, sequential manner automatically, in a continuous, sequential manner, acting on successive business forms to apply a force thereto sufficient to apply a pressure of about 100–200 lbs./lineal inch to activate the pressure sealing adhesive to fix one part of the form to another, the force being applied only to the approximately area of the predetermined width of adhesive, where the activating force is at least 100 pounds (lb.) per lineal inch applied by pairs of metal-surfaced sealing rollers between which roller pairs the forms are nipped and bonded together;

(c) driving each pair of the sealing rollers in opposite rotational directions by a respective pair of driving rollers having elastomeric surfaces, where each of the driving rollers is coaxial and attached to a respective sealing roller; and (d) avoiding the application of a force sufficient to activate a pressure sealing adhesive to areas of the forms outside of the area of the predetermined width of adhesive.

* * * * *